Oct. 7, 1941.  A. G. FELDMAN  2,257,943
BABY CARRIAGE
Filed May 31, 1939   5 Sheets-Sheet 1
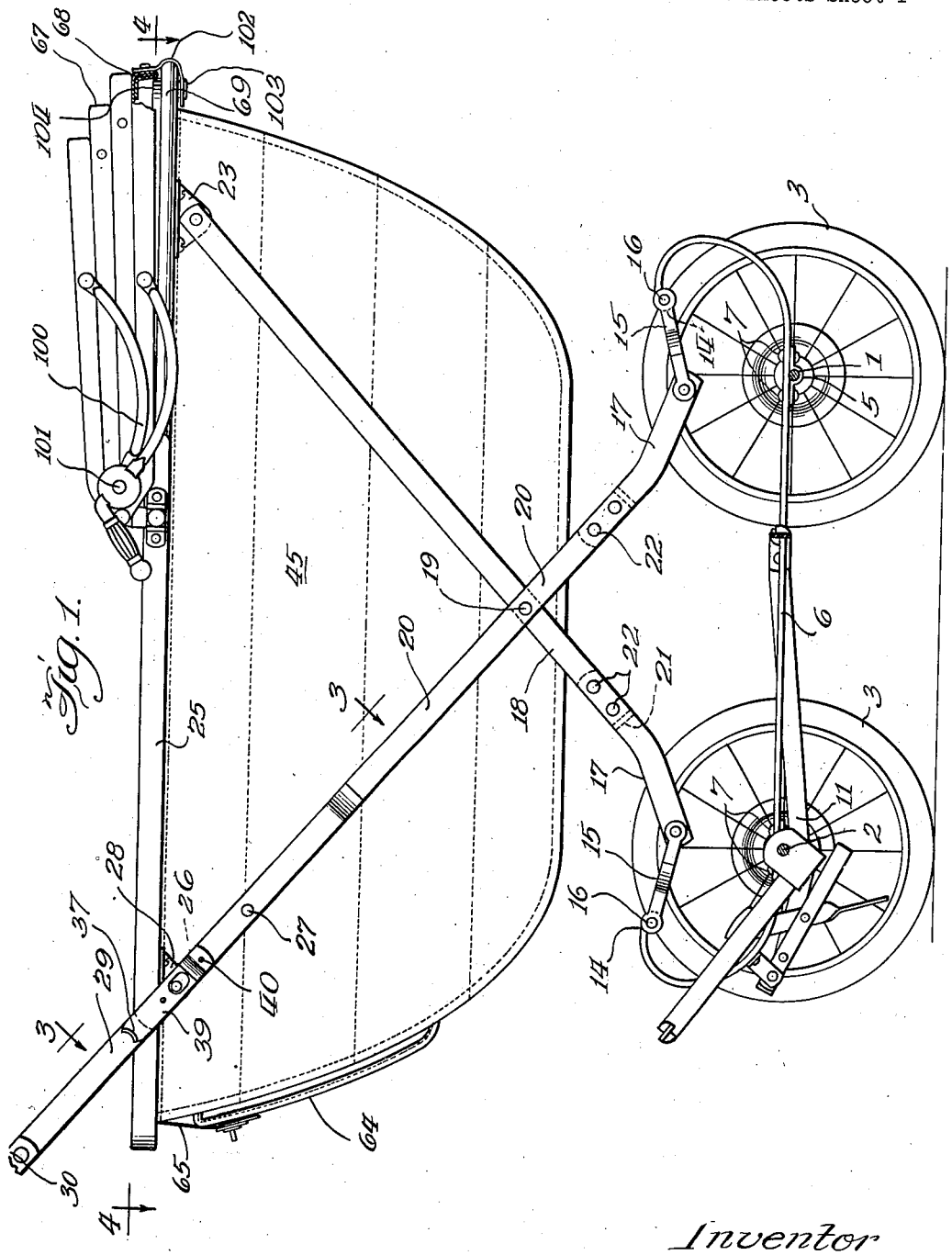
Inventor
Abraham G. Feldman
By Williams, Bradbury,
McCaleb & Hinkle
Attys Oct. 7, 1941.  A. G. FELDMAN  2,257,943
BABY CARRIAGE
Filed May 31, 1939  5 Sheets-Sheet 2
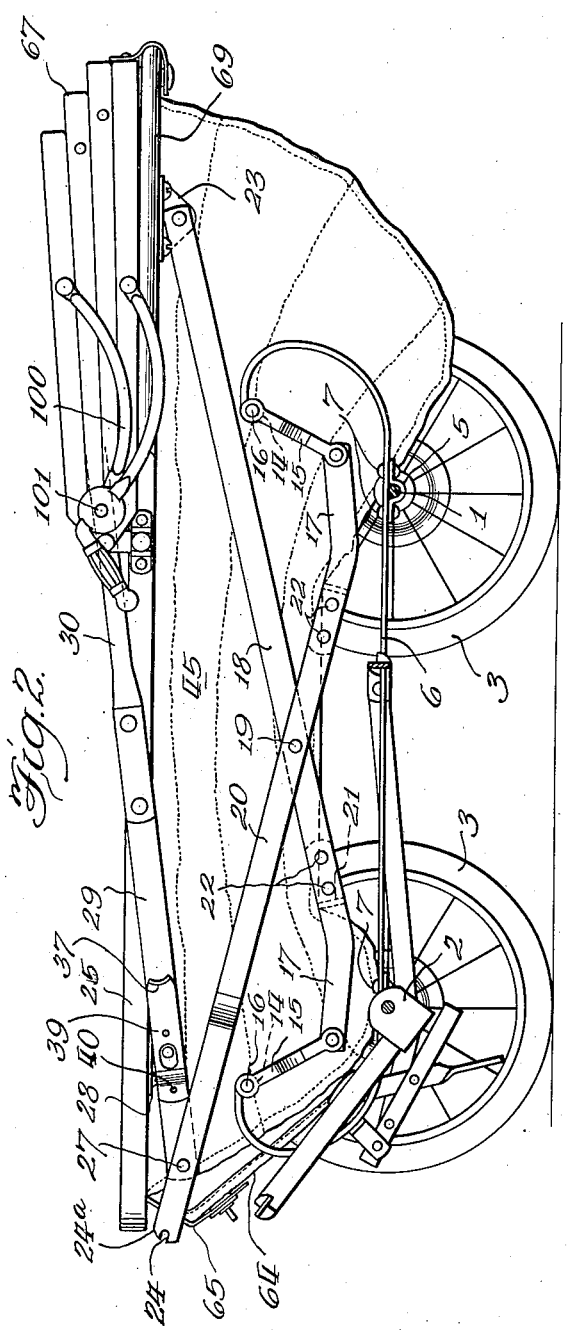
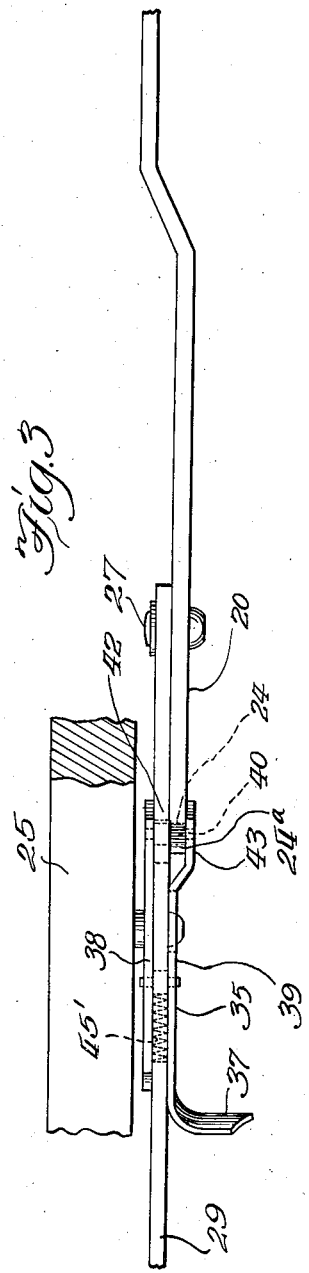
Inventor
Abraham G. Feldman
By Williams, Bradbury,
McCaleb & Hinkle
Attys.

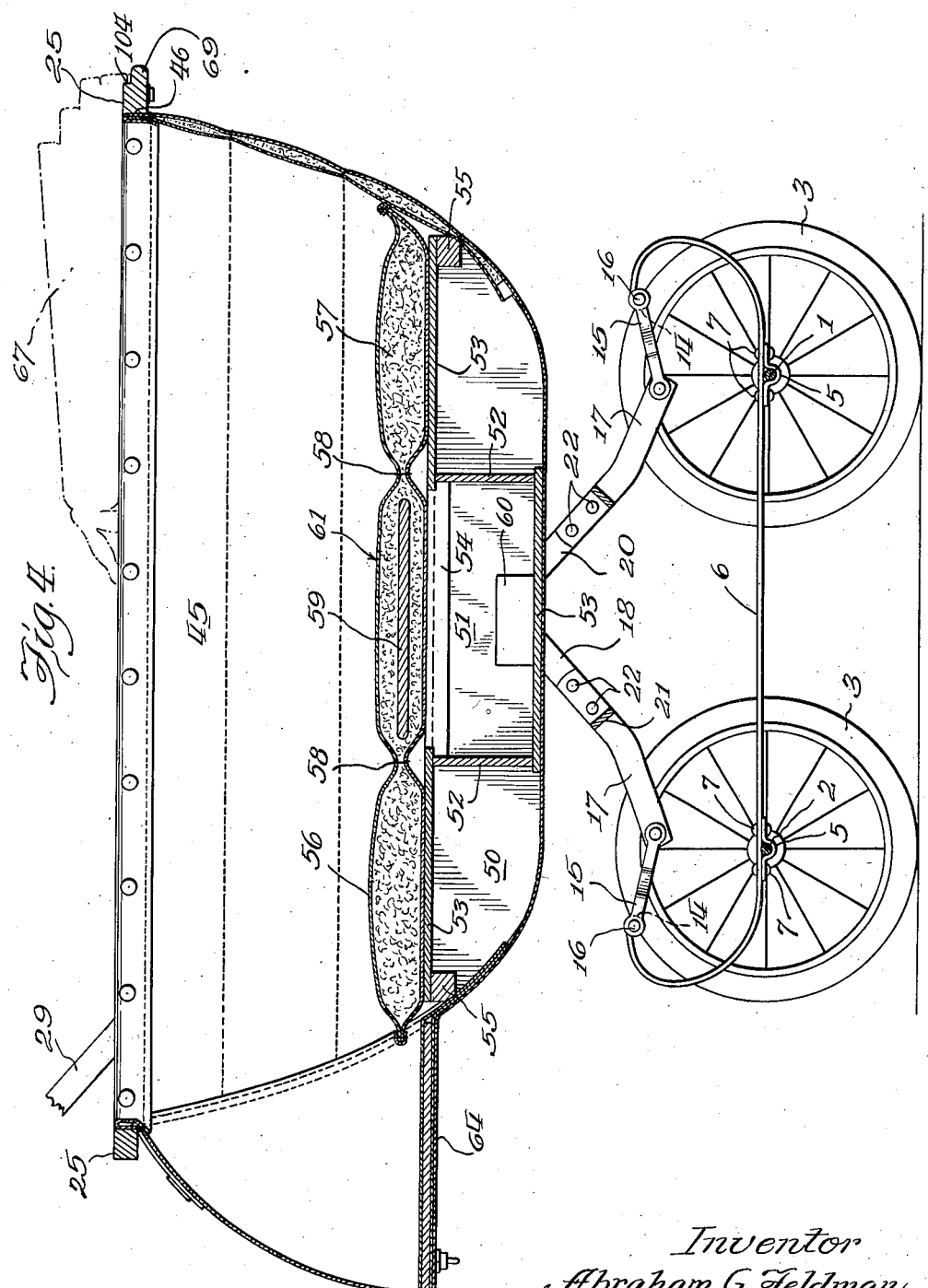

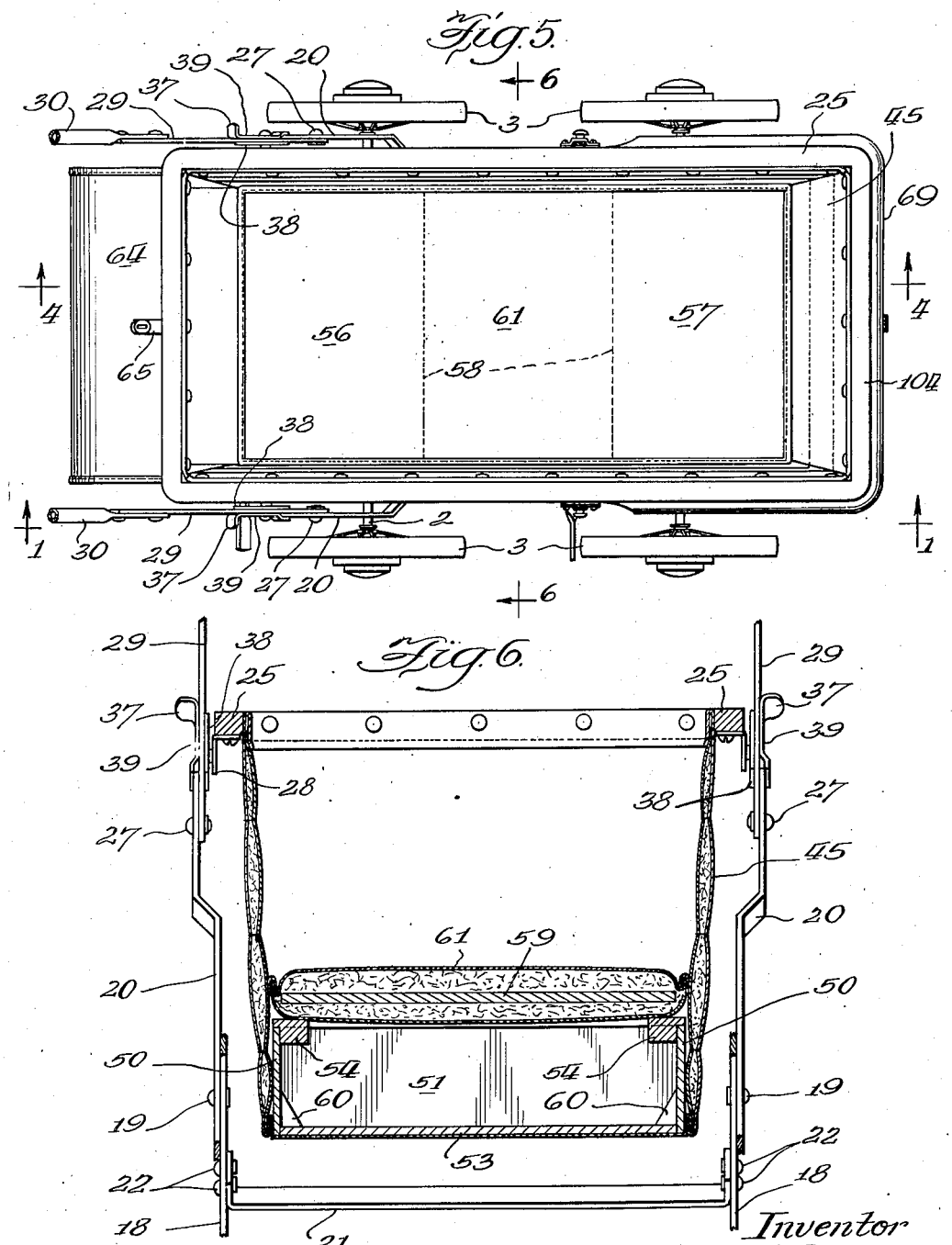

Oct. 7, 1941.  A. G. FELDMAN  2,257,943
BABY CARRIAGE
Filed May 31, 1939  5 Sheets-Sheet 5

Inventor
Abraham G. Feldman
By Williams, Bradbury,
McCaleb & Hinkle
Attys.

Patented Oct. 7, 1941

2,257,943

UNITED STATES PATENT OFFICE 2,257,943

BABY CARRIAGE

Abraham G. Feldman, Chicago, Ill., assignor to Storkline Furniture Corporation, Chicago, Ill., a corporation of Illinois Application May 31, 1939, Serial No. 276,526

2 Claims. (Cl. 296—1)

The present invention relates to baby carriages, and is particularly concerned with baby carriages of the foldable type.

One of the objects of the invention is the provision of an improved baby carriage of the type which is spring supported and which is provided with a flexible basket depending from a rigid frame and provided with a rigid floor.

Another object of the invention is the provision of an improved baby carriage of the class described in which the rigid floor has cushions which are adapted to be so arranged as to present a level bed surface or so that the occupant is adapted to sit up, with his feet in a depending foot well.

Another object is the provision of an improved baby carriage structure of the class described, in which provision is made for an extensible housing at the end, adapted to be used for the storage of merchandise or for extending the length of the basket to adapt it for use as the child grows larger.

Other objects and advantages of the invention will be apparent from the following description and the accompanying drawings, in which similar characters of reference indicate similar views throughout the several views.

Referring to the drawings,

Fig. 1 is a side elevational view of a baby carriage constructed according to the invention, with the carriage in the extended or operative position;

Fig. 2 is a similar view, with the foldable frame-work in folded position;

Fig. 3 is a fragmentary top plan view of the latching arrangement for latching the folding framework in the open position;

Fig. 4 is a vertical sectional view, taken on a plane passing through the carriage midway between its sides, showing the details of structure of the basket, framework, and chassis;

Fig. 5 is a top plan view of the carriage, with its collapsible framework in the open position;

Fig. 6 is a vertical sectional view, taken on the plane of the line 6—6 of Fig. 4;

Figure 7:
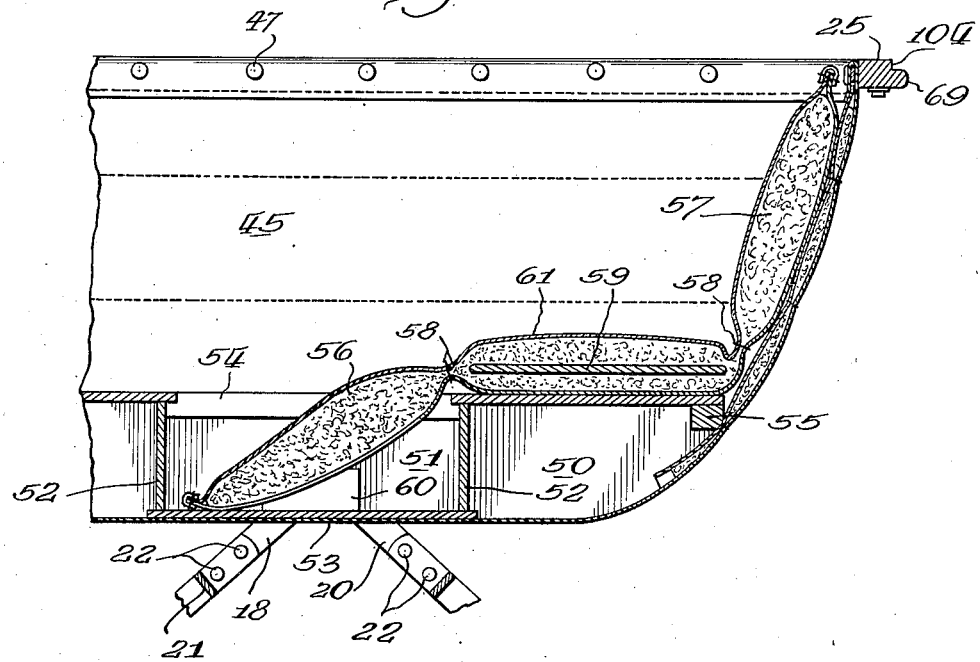
Figs. 7 and 8 are fragmentary sectional views similar to a portion of Fig. 4, showing alternative arrangements for the cushions.

The chassis of the vehicle preferably comprises a pair of axles 1, 2 or rods which are secured to a pair of longitudinally extending springs 6, by means of the U-shaped stirrups 5, which are secured to the springs by rivets 7. The springs 6 extend parallel to each other and are preferably upwardly and inwardly turned at each end, where they are pivotally secured by means of pins 16 to shackles 15.

Each spring has a substantially cylindrical bearing formation 14 surrounding the pin 16 and for pivotal attachment to the shackle 15.

The chassis may carry a brake arrangement of the type disclosed in my prior application, Serial No. 335,257 filed May 15, 1940.

Each axle 1, 2 carries at each end a rubber-tired wheel 3, and the framework of the chassis comprises the springs 6 and axles 1, 2 which form a substantially rectangular frame. Each of the shackles 15, which is pivotally attached to one end of a spring, has its opposite end pivotally secured to one of the scissor bars 18 and 20. The scissor bars 18, 20 are pivotally secured together at 19 by means of a rivet, and there are two such pivotally mounted scissor bars on each side of the vehicle, forming a collapsible framework for the carriage.

The lower ends of the scissor bars 18 and 20 are preferably upwardly turned, as at 17, so as to bring the extreme lower end up into a substantially horizontal position with reference to the upper end of the spring. The weight of the vehicle and the tension placed upon the springs tends, however, to cause the spring shackles 15 to swing downward at their inner ends.

When the framework is unfolded as in Fig. 1, the springs are tensioned by the unfolding of the framework. The similar opposite scissor bars 18, 18 are preferably secured together by transverse frame members 21, comprising a strap or bar of metal, having laterally turned ends which are riveted to the opposite scissor bars 18, 18 or 20, 20 by means of rivets 22. This causes the scissor bars on opposite sides of the carriage to move parallel to each other and collapse at the same time and assures the folding of both sides of the framework simultaneously. It also gives increased rigidity to the assembly and braces the framework.

The body of the carriage is provided by means of an upper rigid frame 25 and a depending flexible basket 45. The upper frame 25 may be formed of wood and is substantially reactangular in plan, as shown in Fig. 5.

The cross section of the upper framework is preferably substantially rectangular, as shown in Fig. 4, at the left half of the frame, but at the right half this wooden frame is preferably provided with a projecting rib 69, which serves to support the frame of a foldable top.

The foldable top 67 comprises a plurality of U-shaped members, which are pivotally secured together at the left end of the top in Fig. 1, and detachably secured to the upper frame 25. The top is provided with a brace 100 for spreading the outermost U-shaped frame members of the top and holding its fabric in taut condition, the brace comprising two parts pivoted at 101.

A strap 102 is secured to the lowermost frame member of the foldable top 67 by a rivet, and has a snapper at 103 for engaging the lower part of the frame 25 to hold that part of the top down, surrounding the shoulder 104.

It will thus be observed that the lower edge of the top 67 may be made to overlap and fit around the shoulder 104 on the frame, giving a wind-and-rain-proof connection between the top and the body.

The body of the carriage preferably includes a depending basket 45, having a pair of side walls, which taper toward the bottom, and its end walls and bottom may be in the form of a continuous strip.

The end and side walls preferably include two layers of the fabric, with cotton, felt, or other padding between the fabric and stitching to hold the cotton in place. The finished surface of the fabric, which may consist of an imitation leather or any suitably coated flexible fabric, is turned outward on the outside of the carriage and inward on the inside of the carriage, thus providing a quilted fabric of finished appearance on all sides.

The padding protects the infant against injury due to engagement by the occupant with the frame, through the walls of the basket.

At the rear end of the vehicle the basket is preferably provided with an extensible member 64, comprising a wood or fiber board panel cover, with the fabric on both sides, and connected by a hinge of the fabric and by bellows, having its side and ends attached to the walls of the basket.

This panel 64 may be fastened in the uppermost position by means of a turned buckle or snapper carried by strap 65, depending from the upper frame 25. It provides a space for the storage of merchandise or a suitable extension for accommodating an occupant, who otherwise would be too long for the carriage, when lying down.

The panel 64 is preferably hinged so that it will be on a level with the floor of the basket when it is in open position, as shown in Fig. 4.

The side walls and ends of the basket are preferably secured to the upper wooden frame 25 at regular spaced intervals by means of screws or nails, the fabric being folded over and turned down to provide a finished folded edge at the top, as shown in Fig. 4.

In order to support the basket on the chassis, the two scissor bars 18 (Fig. 1) are directly and pivotally secured to the upper frame 25 at its lower side by means of an angle bracket 23, having rivets passing through the brackets and bars. Angle brackets 23 are located adjacent the forward end of the sides of the frame 25. A similar angle bracket 28 is located adjacent the opposite ends of the sides 25 for the purpose of pivotally securing each of the two legs 29 of a handle 30 to the upper frame 25. The legs 29 of the handle extend below the angle bracket, and are pivotally secured at 27 to the scissor bars 20.

The scissor bar 20 projects upward beyond the rivet 27 and is provided with a slot 24 and beveled edge 24A. The slot 24 engages a rivet 40, carried by the two legs 38 and 39 of the slider, which may be actuated by means of the laterally turned finger piece 37. The slider 38, 39 is urged downward by a compression spring 45', which is housed inside the leg 29 of the handle. By virtue of the beveled surface 24A the slider 38, 39 is forced upward when the carriage is unfolded and the beveled surface engages the rivet 40.

The rivet 40 and slot 24 hold the scissors in open position, but the carriage may be folded by pulling upward on the finger piece 37 on each side and permitting the handle to move in a clockwise direction, which it does under the action of the springs, and due to the weight of the basket acting on the scissors.

The scissors and the basket then fold down in between the springs, and by virtue of the downward movement of the spring shackles, the folding mechanism is adapted to move down between the ends of the springs.

The basket 45 is preferably provided with a floor insert 51, which may be constructed of suitable lumber, such as plywood. The two sides 50 of this wooden insert comprise elongated strips of plywood formed at each end like the front of a sled runner so as to be a substantial fit within the contour of the basket.

At each end the side members 50 are joined by the transverse wooden end frame members 55, and the side frame members may also be joined intermediate the ends thereof by a pair of transverse partitions 52, which aid in defining a centrally located foot well.

The bottom of the foot-well is formed by a piece of plywood 53, which is joined to the side frame members and the partitions 52, and the space between each partition 52 and the end frame member 55 is bridged by a floor panel 53, which is also secured to the side frame members 50. The side frame members at the top on each side of the well are reinforced by a piece of lumber 54, and a triangular block 60 serves as a brace between the bottom 53 and the side frame members 50. The foot-well is open at the top.

All of these pieces of lumber may be glued, as well as nailed together, to provide a rigid structure which fits in the bottom of the basket.

The depth of the foot-well formed by the partitions 52 and bottom 53 is such that the bottom 53 rests on the bottom of the carriage. When the end frame members 55 engage the ends of the basket, this insert provides a substantially level floor 53, which has an opening at the middle into the foot-well 54. The opening may be bridged by means of a centrally located cushion 61, which is long enough to rest upon the side frame members of the foot-well, and which is provided with a rigid plywood insert 59.

The central cushion 61, as well as two other cushions 56 and 57, comprise members made of the same covering as the basket, and formed out of an upper and lower strip, sewed together and provided with a folded tape at the edge.

Figure 8:
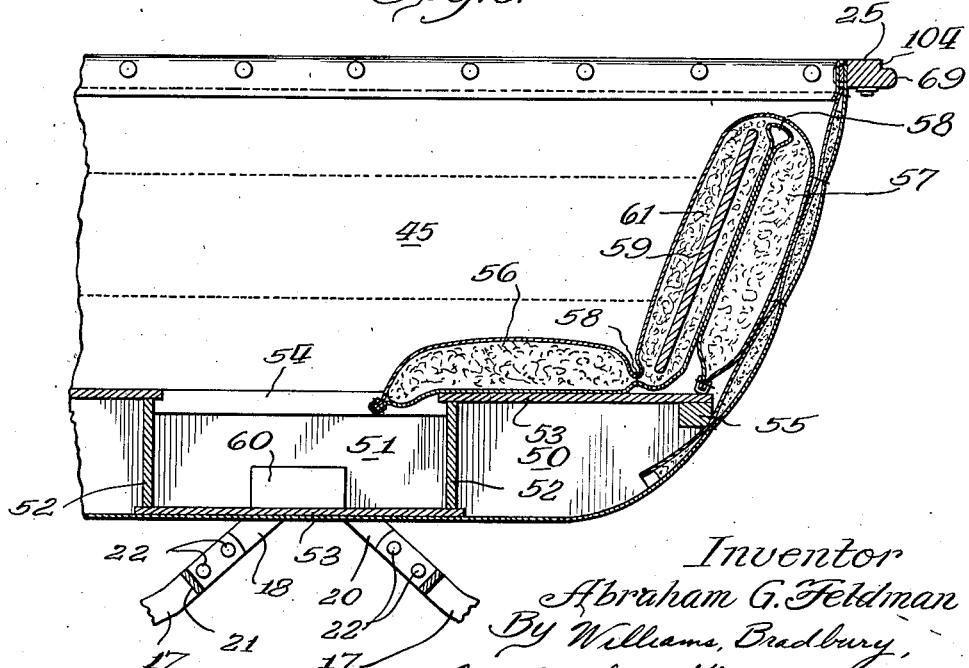

The cushion chambers 56, 61, and 57 may be divided by means of seams 58 and filled with Kapok or other suitable cushioning fibers, the Kapok preferably being on both sides of the panel 59. The length of all three cushions is such that the complete cushion fills the bottom of the basket and covers the insert 51. These cushions may also be used for the purpose of providing a more rigid back by folding the cushions, as shown in Fig. 8, so that the foot-well is exposed under the cushion, as shown in Fig. 7, in which case the end of the basket provides a back which is padded by one cushion, and the oppositely located cushion depends into the foot-well and cushions the edge of the foot-well, in which the legs of the occupant hang.

The foot-well may also be used when the cushions are disposed as shown in Fig. 4, for transporting merchandise or additional clothing, food, or a receptacle of suitable character. The insert may also be used for supporting harness and straps which retain the infant in its carriage and protect it against accidents due to standing up or other causes.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A baby carriage of the type including a basket, an insert therefor having a central well and a deck on either side thereof, and a pad for said insert, characterized by a pad comprising a fabric container divided into three sections by two lateral seams, each section being padded, and the central section being reinforced by a flat plate of relatively rigid material disposed within the padding and of sufficient extent to cover the said central well.

2. A bottom insert for baby carriages having a flexible basket comprising a rigid member having a pair of side frame members, each provided with a substantially straight upper edge and a lower edge, the contour of which corresponds to the lower contour of the side walls of a flexible basket with which it is to be used, said side frame members being joined at each end by a top panel member and being joined at their central portions by a bottom panel member, a pair of vertical frame members joining said bottom panel member, one of which joins said bottom panel member and each of said top members, to form a well, and a pair of longitudinally extending top frame members extending along the upper edge of said side frame members at said well to provide a support for a cover, and a movable pad for said rigid bottom insert, said movable pad comprising three pad sections joined together and having their upper and lower covers stitched together at the point of juncture to form a line at which the pad folds between sections, said sections being arranged in tandem, and the central of said sections being provided with a rigid panel insert adapted to bridge said well and rest upon said upper side frames or to be used as a back rest.

ABRAHAM G. FELDMAN.